(12) United States Patent
Hestehave et al.

(10) Patent No.: US 6,264,265 B1
(45) Date of Patent: Jul. 24, 2001

(54) VEHICLE SUN VISOR EXTENSION

(75) Inventors: Borge T. Hestehave, Alta Loma; Kjeld Hestehave, Upland, both of CA (US)

(73) Assignee: Bomatic, Inc., Ontario, CA (US)

( * ) Notice: Subject to any disclaimer, the term of this patent is extended or adjusted under 35 U.S.C. 154(b) by 0 days.

(21) Appl. No.: 09/494,664

(22) Filed: Jan. 31, 2000

(51) Int. Cl.$^7$ .................................................. B60J 3/00
(52) U.S. Cl. ............................... 296/97.6; 296/97.1
(58) Field of Search .......................... 296/97.1, 97.6, 296/97.8

(56) References Cited

U.S. PATENT DOCUMENTS

| | | |
|---|---|---|
| 2,432,674 | 12/1947 | Office . |
| 3,480,322 | * 11/1969 | Pollak . |
| 3,649,068 | * 3/1972 | Moynihan . |
| 4,023,855 | 5/1977 | Janata et al. . |
| 4,058,340 | 11/1977 | Pinkas . |
| 4,330,148 | 5/1982 | Lamont . |
| 4,776,628 | 10/1988 | Polito . |
| 4,792,176 | 12/1988 | Karford . |
| 5,112,096 | 5/1992 | Keenan . |
| 5,249,835 | 10/1993 | Emoto . |
| 5,356,192 | 10/1994 | Schierau . |
| 5,470,122 | 11/1995 | Feng . |
| 5,651,577 | * 7/1997 | Lacy et al. . |

* cited by examiner

Primary Examiner—Joseph D. Pape
Assistant Examiner—Scott Carpenter
(74) Attorney, Agent, or Firm—Nixon Peabody LLP; David S. Safran

(57) ABSTRACT

A cardboard blank configured for creation of a sun visor extension and sun visor produced from the blank in which a front panel and a back panel have a height approximately one-third to one-quarter larger than conventional vehicle sun visors with which the sun visor extension is to be used. A narrow bottom edge panel is connected at each of opposite sides thereof to a respective one of the front and rear panels via a folding line, a narrow outer top edge panel is connected via a folding line to an edge of the front panel that is opposite the bottom edge panel, and a narrow inner top edge panel is connected via a folding line to an edge of the back panel that is opposite the bottom edge panel. The outer top edge panel is provided with a locking tab which is connected thereto by a folding line and a receiving slot is provided at the folding line at which the inner top edge panel connects with the back panel. The locking tab is lockingly engaged in the receiving slot when said blank is folded about its folding lines into a sleeve-shaped configuration that can be slid over a motor vehicle sun visor to enable it extend down lower. A C-shaped cut is provided in the front panel creating a fold-up flap and mirror access opening for vehicle visors equipped with a vanity mirror.

8 Claims, 2 Drawing Sheets

VEHICLE SUN VISOR EXTENSION

BACKGROUND OF THE INVENTION

1. Field of the Invention

The invention relates to sun visor extensions for use on the standard sun visor of motor vehicles. In particular, the invention relates to sun visor extensions which can be mounted over the existing vehicle sun visor so as to extend the vertical height thereof downward in its in use position.

2. Description of Related Art

As anyone who has ridden in the front seat of an automobile is aware, vehicles are equipped with sun visors that are intended to be used to shield the driver and/or front passenger's eyes from the sun, but often such standard sun visors do not extend low enough to be effective, especially for persons of less than average height. As a result, numerous devices have been developed which can be attached to the existing vehicle sun visor so as to extend the vertical height thereof further downward in its in use position. Examples of the various types of sun visor extensions that have been developed can be found in U.S. Pat. Nos. 2,432,674; 4,023,855; 4,058,340; 4,330,148; 4,776,628; 4,792,176; 5,112,096; 5,249,835; 5,356,192; and 5,470,122.

However, the known sun visors extension are, for the most part, more complex, and as a result more expensive than they need to be, and many times are not very easy to mount to the vehicle sun visor or to use. Furthermore, many vehicle sun visors are equipped with vanity mirrors which can no longer be used with many of the know sun visor extensions.

SUMMARY OF THE INVENTION

In view of the foregoing, it is a primary object of the present invention to provide a sun visor extension that is simple and inexpensive to produce, and is easy to mount and to use.

A further object of the present invention is to provide a sun visor extension that will not interfere with use of any vanity mirror with which the vehicle sun visor may be equipped.

The above objects of the invention are obtained by the sun visor being made of a one-piece card board blank that is easily folded into its working configuration and secured in that configuration without any separate fasteners. Furthermore, a hinged flap can be cut from a panel section of the visor extension to enable easy access to a vanity mirror on the vehicle sun visor.

These and further objects, features and advantages of the present invention will become apparent from the following description when taken in connection with the accompanying drawings which, for purposes of illustration only, a single embodiment in accordance with the present invention.

DETAILED DESCRIPTION OF THE INVENTION

Figure 1:
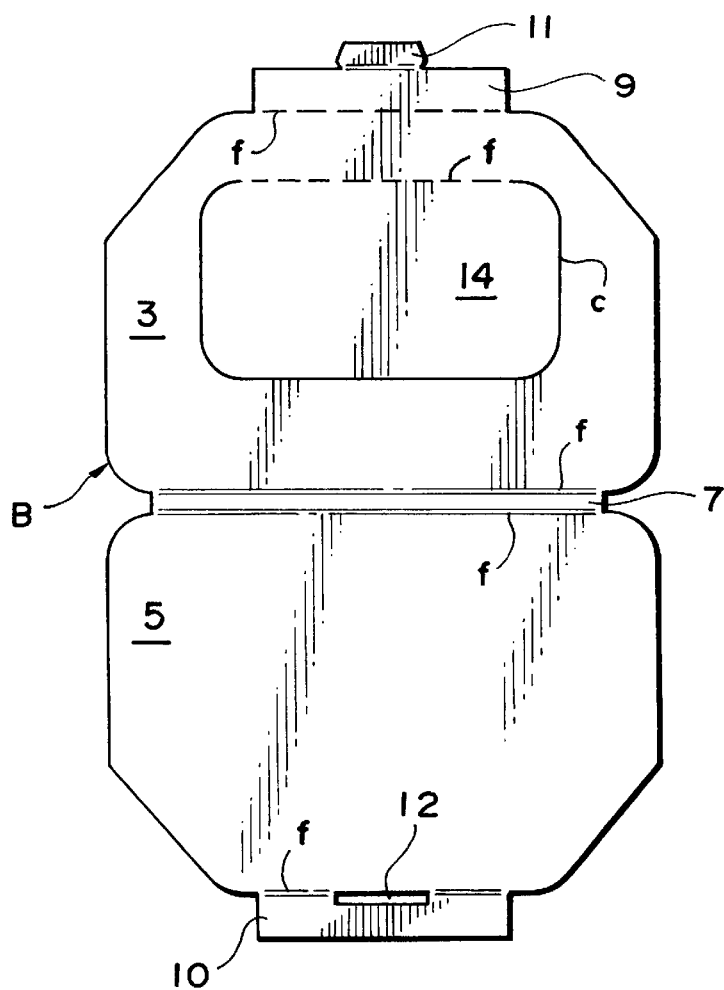
FIG. 1 is a plan view of a cardboard blank from which the sun visor extension of the present invention is assembled.

The sun visor extension 1 in accordance with present invention is formed of a one-piece cardboard blank, particularly corrugated cardboard blank B, such as that shown in FIG. 1. The blank B has a pair of major panels, comprised of a front panel 3 and a back panel 5. The front panel 3 is connected to a narrow bottom edge panel 7 via folding lines f as is the back panel 5. An outer top edge panel 9 is connected to the opposite edge of the front panel 3 from the bottom edge panel 7 via a folding line f. Similarly, an inner top edge panel 10 is connected to the opposite edge of the back panel 5 from the bottom edge panel 7 via a folding line f. Still further, the outer top edge panel 10 is provided with a locking tab 11, which can be engaged in a receiving slot 12 provided at the folding line f at which it connects with the back panel 5. The folding lines can be formed by scoring, compression or any other means known in the packaging industry for producing lines about which panels of a cardboard blank can be easily folded, the manner of producing the folding lines, by itself, not forming part of this invention.

Figure 2:
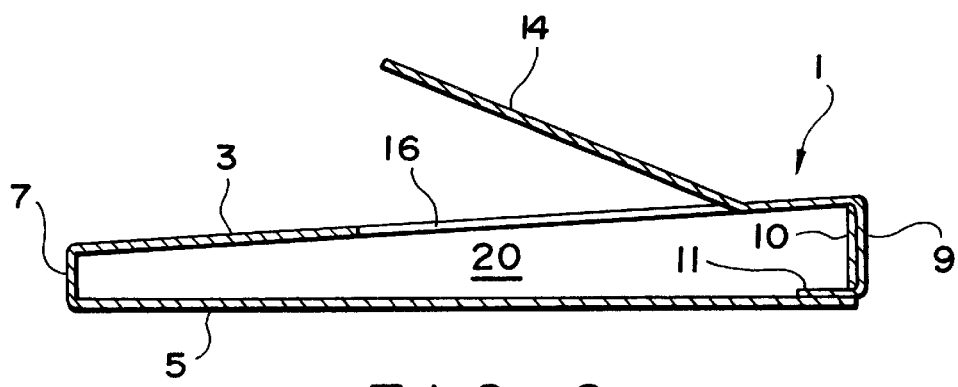
FIG. 2 is a cross-sectional view of the assembled sun visor extension.
Figure 3:
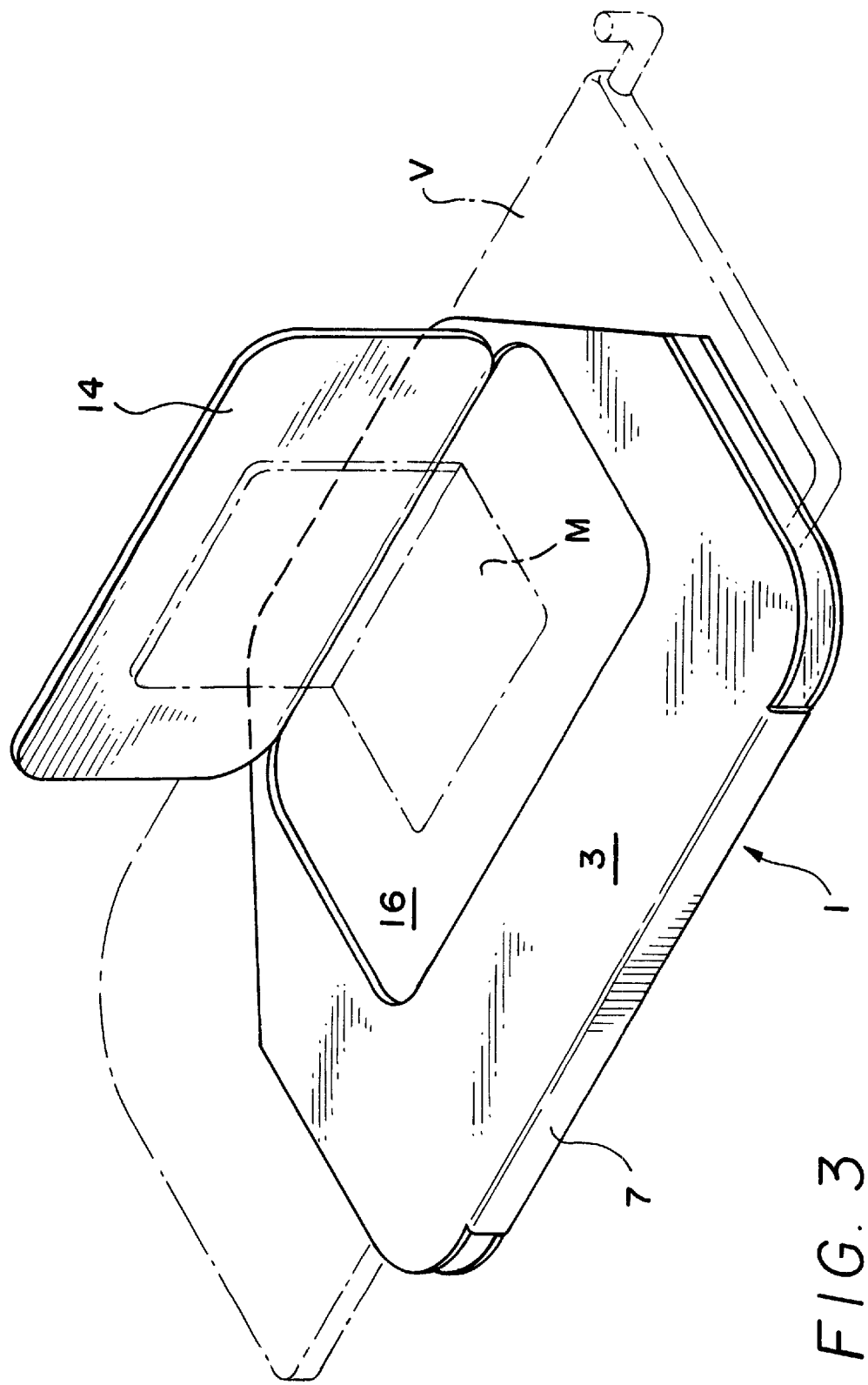
FIG. 3 is a perspective view of the sun visor extension shown on a vehicle sun visor that is depicted in phantom outline with an open vanity mirror.

Thus, by folding blank B along the folding lines f and inserting the locking tab 11 into the receiving slot 12, the blank B is transformed into a visor extension having the sleeve-shaped configuration shown in FIGS. 2 & 3. To mount the visor extension 1 over a vehicle sun visor V, it is only necessary to slide the sun visor extension 1 on to the sun visor V at its free end until it is properly positioned thereon.

To enable continued access to a vanity mirror located on the visor, the front panel 3 has a flap portion 14 thereof which has been partially freed therefrom by a generally C-shaped cut c, leaving an area of the top edge of the flap portion 14 where a hinge-forming folding line f is provided instead. In this way, the portion 14 creates an access opening 16 through which a vanity mirror M on the vehicle visor V can be viewed. Furthermore, by making opening 16 large enough to expose a substantial portion of the visor V, access to the mirror M can be insured despite variations in the size and location of the mirror M from one type of car to another, and while still providing the user with a sufficient degree of freedom in placement of the sun visor extension 1 on the vehicle sun visor V.

Additionally, as is apparent from FIG. 2, the bottom edge panel 7 is substantially narrower than the upper edge panels 9, 10, thus giving the extension 1 a wedge-shaped cross section. The advantage to this feature is that it allows the sun visor extension 1 to conform more closely to the shape of most standard sun visors, which tend to have an upper portion that is wider than the lower portion. Furthermore, since the sun visor extension 1 is not custom made to fit any one particular vehicle visor, this shape allows it to have a visor receiving space 20 that is wide enough in a front-to-back direction to allow the sun visor extension 1 to be easily slid over most vehicle sun visors V of a standard range of visor thicknesses, yet a proper fit of the sun visor extension 1 on the vehicle sun visor V can be obtained, sliding the extension upwardly or downwardly relative to the vehicle sun visor V to enable the sun visor V to seat snuggy in the lower portion of the receiving space, thereby frictionally holding the sun visor extension 1 in place. However, obtaining of a snug fit is not necessary and it is sufficient for the extension 1 to fit loosely over the vehicle sun visor V with panel 10 of the extension 1 merely resting on the sun visor V.

While it should be appreciated that various modifications can be made to the shape and size of the sun visor extension 1 and the individual panels and panel portions thereof, by way of example only, it is noted that a sun visor extension 1 having the following dimensions has proven suitable for use in conjunction with the standard sun visors of a large percentage of the vehicles currently in use in the United States:

Width of panels 3 & 5 at widest portion: 12–13.5 inches;

Height of panels 3 & 5 at tallest portion: 9–10.25 inches;

Width of flap portion 14: 8.5–9.25 inches;

Height of flap portion 14: 4.25–5 inches;

Width of bottom edge panel 7: 0.5–0.625 inches; and

Height of top edge panel 9: 1.0–1.25 inches

As can be appreciated from the foregoing, the sun visor extension of the present invention is simple and inexpensive to produce, and is easy to mount and to use. Furthermore, because the sun visor extension is made of a one-piece card board blank that is easily folded into its working configuration and secured by a simple integral tab and slot arrangement, the sun visor extension can be shipped and sold in its flat blank form with the purchaser/user performing the assembly and installation, thereby further contributing to the ability of this product to be sold for a very low price. In fact packaging and separate instructions can be dispensed with, it being practical to apply trademarking, assembly and use instructions as well as any other labeling directly to the cardboard blank B on the side thereof which will become the interior of the sleeve, where it will be hidden after assembly, while the side which will become the exterior of the visor extension 1 can be colored or patterned or otherwise decorated to have a desired appearance.

While only a single embodiment in accordance with the present invention have been shown and described, it is understood that the invention is not limited thereto, and is susceptible to numerous changes and modifications as known to those skilled in the art. For example, while blank has been provided with an integral tongue-and-slot arrangement, such can be omitted and other connection techniques used; for example, borrowing from the envelope art, a self-adhering adhesive can be applied to one of the panels 9, 10 and an easily removed protective strip applied thereover, the protective strip being removed and the panels 9, 10 adhered together for assembly of the blank into the extension.

Likewise, while the visor extension 1 of the preferred embodiment has an integral flap portion 14 which creates access opening 16, the visor extension can be provided with the access opening 16 but without the flap portion 14 which acts as a cover for it. In this regard, in such a case, the part of the panel 3 in the area of opening 16 (i.e., the area corresponding to that of portion 14, can be simply cut out from the blank during cutting out of the blank B itself or portion 14 can be formed as a punch-out portion, giving the purchaser the option of leaving the portion 14 in place if the visor is not equipped with a vanity mirror or punching-out portion 14 if one does exist.

Therefore, this invention is not limited to the details shown and described herein, and includes all such changes and modifications as are encompassed by the scope of the appended claims.

We claim:

1. Cardboard blank configured for creation of a sun visor extension, comprising a front panel and a back panel of a height approximately one-third to one-quarter larger than conventional vehicle sun visors with which the sun visor extension is to be used, a narrow bottom edge panel connected at each of opposite sides thereof to a respective one of the front and rear panels via a folding line, a narrow outer top edge panel connected via a folding line to an edge of the front panel that is opposite the bottom edge panel, and a narrow inner top edge panel connected via a folding line to an edge of the back panel that is opposite the bottom edge panel; wherein at least one of the outer top edge panel and the inner top edge panel is provided with means for securing of the outer top edge panel overlying the inner top edge panel when said blank is folded about said folding lines into a sleeve-shaped configuration; wherein said means for securing comprises the outer top edge panel being provided with a locking tab which is connected thereto by a folding line and a receiving slot being provided at the folding line at which the inner top edge panel connects with the back panel, said locking tab being lockingly engageable with said receiving slot when said blank is folded about said folding lines into said sleeve-shaped configuration.

2. Cardboard blank according to claim 1, wherein a C-shaped pre-cut is provided in said front panel for creating a fold-up flap and mirror access opening.

3. Cardboard blank according to claim 2, wherein said inner and outer top edge panels are wider than said bottom edge panel in a direction crosswise to said fold lines, whereby said sleeve-shaped configuration will have a truncated wedge-shaped cross section.

4. Cardboard blank according to claim 1, wherein said inner and outer top edge panels are wider than said bottom edge panel in a direction crosswise to said fold lines, whereby said sleeve-shaped configuration will have a truncated wedge-shaped cross section.

5. Sun visor extension comprising a front panel and a back panel of a height approximately one-third to one-quarter larger than conventional vehicle sun visors with which the sun visor extension is to be used, a narrow bottom edge panel connected at each of opposite sides thereof to a respective one of the front and rear panels via a folding line, a narrow outer top edge panel connected via a folding line to an edge of the front panel that is opposite the bottom edge panel, and a narrow inner top edge panel connected via a folding line to an edge of the back panel that is opposite the bottom edge panel; wherein the outer top edge panel and the inner top edge panel are secured with the outer top edge panel overlying the inner top edge panel producing a sleeve-shaped configuration with the front, back and bottom edge panels; wherein the outer top edge panel is provided with a locking tab which is connected thereto by a folding line; wherein a receiving slot is provided at the folding line at which the inner top edge panel connects with the back panel; and wherein said locking tab is lockingly engaged within said receiving slot.

6. Sun visor extension according to claim 5, wherein a C-shaped cut is provided in said front panel creating a fold-up flap and mirror access opening.

7. Sun visor extension according to claim 5, wherein said inner and outer top edge panels are wider than said bottom edge panel in a direction between said front and back panels, whereby said sleeve-shaped configuration has a truncated wedge-shaped cross section.

8. Sun visor extension according to claim 5, wherein said inner and outer top edge panels are wider than said bottom edge panel in a direction between said front and back panels, whereby said sleeve-shaped configuration has a truncated wedge-shaped cross section.

* * * * *